(12) United States Patent
Rock, Jr. et al.

(10) Patent No.: US 11,484,892 B2
(45) Date of Patent: Nov. 1, 2022

(54) SYSTEMS AND METHODS FOR REDUCING PARTICULATE EMISSIONS

(71) Applicant: General Electric Company, Schenectady, NY (US)

(72) Inventors: Peter Joseph Rock, Jr., Boston, MA (US); Cassidy Charles Shibiya, Harrison, OH (US); Travis Gene Sands, Lebanon, OH (US); Joshua Tyler Mook, Loveland, OH (US); Zachary William Nagel, Liberty Township, OH (US); Mary Kathryn Thompson, Fairfield Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/130,465

(22) Filed: Dec. 22, 2020

(65) Prior Publication Data

US 2021/0197214 A1   Jul. 1, 2021

Related U.S. Application Data

(60) Provisional application No. 62/955,058, filed on Dec. 30, 2019.

(51) Int. Cl.
*B01D 50/00* (2022.01)
*B04C 5/10* (2006.01)
(Continued)

(52) U.S. Cl.
CPC ............... *B04C 5/10* (2013.01); *B01D 45/12* (2013.01); *B04C 5/04* (2013.01); *B04C 5/081* (2013.01); *B04C 5/13* (2013.01); *B04C 5/28* (2013.01)

(58) Field of Classification Search
CPC .. B04C 5/10; B04C 5/04; B04C 5/081; B04C 5/28; B04C 5/13; F01N 2260/06;
(Continued)

(56) References Cited

U.S. PATENT DOCUMENTS 1,897,195 A *  2/1933  Howden .................. B04C 7/00
                                                          55/455
3,013,628 A    12/1961  Jacobs et al.
(Continued)

FOREIGN PATENT DOCUMENTS

CN        201815393 U    5/2011
DE        2946483 C2     4/1988
(Continued)

*Primary Examiner* — Dung H Bui
(74) *Attorney, Agent, or Firm* — Dority & Manning, P.A.

(57) ABSTRACT

A particle separator for removing particles from a gaseous stream, the particle separator having a separator body having a centerline axis and a peripheral wall defining a separation chamber, a fluid inlet in fluid communication with the separation chamber, a particle outlet in fluid communication with the separation chamber, a fluid outlet in fluid communication with the separation chamber, and a plurality of angled inlet apertures fluidly coupled between the fluid inlet and the separation chamber. A particulate separation system for removing particles from a gaseous stream, the particulate filtration system having an inlet, an outlet, and a plurality of particle separators located between and in fluid communication with, the inlet and the outlet, wherein each of the plurality of particle separators receives less than about 5 percent by volume of the flow of the gaseous stream entering the inlet.

20 Claims, 15 Drawing Sheets

(51) Int. Cl.
    *B04C 5/04*           (2006.01)
    *B04C 5/081*         (2006.01)
    *B01D 45/12*        (2006.01)
    B04C 5/28          (2006.01)
    B04C 5/13          (2006.01)

(58) Field of Classification Search
    CPC ............ F01N 2470/02; F01N 2470/18; F01N 2470/24; F01N 3/037; B01D 45/12; F02M 35/0223
    See application file for complete search history.

(56) References Cited

U.S. PATENT DOCUMENTS

| | | | |
|---|---|---|---|
| 3,132,473 A | | 5/1964 | Hass |
| 3,470,678 A | * | 10/1969 | Schumacher ............ B04C 5/20 55/435 |
| 3,969,096 A | | 7/1976 | Richard |
| 4,505,051 A | * | 3/1985 | Herchenbach ........ F27B 15/003 34/594 |
| 5,403,557 A | | 4/1995 | Harris |
| 5,441,081 A | * | 8/1995 | Maury ..................... B04C 5/13 138/155 |
| 5,554,343 A | | 9/1996 | Wade |
| 7,266,943 B2 | | 9/2007 | Kammel |
| 7,662,201 B2 | * | 2/2010 | Lee .......................... A47L 9/165 55/343 |
| 7,841,477 B2 | * | 11/2010 | Hansen ................. F27B 7/2016 208/161 |
| 8,512,451 B1 | * | 8/2013 | Heumann ................ B04C 5/28 95/271 |
| 8,728,190 B2 | * | 5/2014 | Werchowski ............ B04C 5/13 55/447 |
| 10,184,399 B2 | | 1/2019 | Judd et al. |
| 2002/0043055 A1 | | 4/2002 | Conrad |
| 2004/0216611 A1 | | 11/2004 | Moredock |
| 2009/0133370 A1 | * | 5/2009 | Yoo ........................ A47L 9/1666 55/455 |
| 2012/0324847 A1 | * | 12/2012 | Dupree ................... F27D 1/045 228/101 |
| 2018/0229167 A1 | | 8/2018 | Rambo |
| 2019/0009282 A1 | * | 1/2019 | Damkjær ................. B04C 5/13 |
| 2019/0255538 A1 | * | 8/2019 | Mercier ................. F16B 2/065 |

FOREIGN PATENT DOCUMENTS

DE        102006023589 A1      11/2007
WO       WO9956854 A1         11/1999

* cited by examiner

SYSTEMS AND METHODS FOR REDUCING PARTICULATE EMISSIONS

PRIORITY INFORMATION

The present application claims priority to U.S. Provisional Patent Application Ser. No. 62/955,058 filed on Dec. 30, 2019, which is incorporated by reference herein for all purposes.

TECHNICAL FIELD

The present invention pertains to systems and method for reducing particulate emissions by separating particles from a particle-laden fluid flow.

BACKGROUND OF THE INVENTION

Particle-laden fluid flows, particularly gaseous fluid flows, are common in many aspects of household, industrial, and other aspects of daily life. The particles in such fluid flows may be naturally-occurring, or may be introduced into the fluid flow through some process such as combustion or through entrainment of particles through wind or other phenomena.

Internal combustion engines are utilized in many facets of daily life and find applications in both stationary installations and moving vehicles of various sorts. From portable generators and pumping stations, to on- and off-road trucks, ships, and railroad locomotives, internal combustion engines provide the power to produce useful work in all of these applications. The internal combustion process, however, may cause combustion by-products in particulate form, such as soot, to become entrained in exhaust gases. Additionally, atmospheric air may also contain particles of environmental dust which would be desirable to remove prior to the combustion process or which add to the particles generated by the combustion process itself.

Industrial and manufacturing processes may also give rise to particles becoming suspended in a gaseous environment or flow. In these scenarios, as with others such as internal combustion engines, the suspended particles and/or the gaseous flow itself may be at elevated temperatures, that is, at temperatures well above what would be considered normal ambient room temperature.

Suspended particles may be of uniform or non-uniform size, shape, and/or mass, and may arise in a bi-modal or multi-modal distribution of size and/or shape.

Particle separators known in the art come in many forms, such as electrostatic precipitators, media filters, and inertial separators. However, many of these particle separators require power sources, servicing or replacement, or may induce undesirably large losses to the fluid flow such as pressure drop losses.

It would therefore be desirable to provide a system and method for reducing particulate emissions by separating particles from a particle-laden fluid flow with reduced energy requirements, servicing requirements, and fluid flow losses.

BRIEF DESCRIPTION OF THE INVENTION

In one aspect, a particle separator for removing particles from a gaseous stream, having a separator body having a centerline axis and a peripheral wall defining a separation chamber, a fluid inlet in fluid communication with the separation chamber, a particle outlet in fluid communication with the separation chamber, a fluid outlet in fluid communication with the separation chamber, and a plurality of angled inlet apertures fluidly coupled between the fluid inlet and the separation chamber.

In another aspect, a particle separator for removing particles from a gaseous stream having a separator body having a centerline axis and a peripheral wall defining a separation chamber, a fluid inlet in fluid communication with the separation chamber, a particle outlet in fluid communication with the separation chamber, a fluid outlet in fluid communication with the separation chamber, and a vortex tube having a hollow interior and a peripheral wall extending along the centerline axis and fluidly coupling the fluid outlet and the separation chamber.

In another aspect, a particle separator for removing particles from a gaseous stream having a separator body having a centerline axis and a peripheral wall defining a separation chamber, a fluid inlet in fluid communication with the separation chamber, a particle outlet in fluid communication with the separation chamber, a fluid outlet in fluid communication with the separation chamber, a vortex tube having a hollow interior and a peripheral wall extending along the centerline axis and fluidly coupling the fluid outlet and the separation chamber, wherein the vortex tube has a free end with a radially outwardly projecting lip.

In another aspect, a particle separator for removing particles from a gaseous stream having a separator body having a centerline axis and a peripheral wall defining a separation chamber, a fluid inlet in fluid communication with the separation chamber, a particle outlet in fluid communication with the separation chamber, a fluid outlet in fluid communication with the separation chamber, and a vortex tube having a hollow interior and a peripheral wall extending along the centerline axis and fluidly coupling the fluid outlet and the separation chamber, wherein the vortex tube has a free end with a plurality of apertures for directing a portion of a gaseous stream axially and radially outwardly from the free end.

In a further aspect, a particle separator for removing particles from a gaseous stream having a separator body having a centerline axis and a peripheral wall defining a separation chamber, a fluid inlet in fluid communication with the separation chamber, a particle outlet in fluid communication with the separation chamber, a fluid outlet in fluid communication with the separation chamber, and a vortex tube having a hollow interior and a peripheral wall extending along the centerline axis and further including a hollow annular inlet plenum fluidly coupling the fluid inlet and the separation chamber, wherein the peripheral wall of the vortex tube further comprises a plurality of tangential inlet apertures fluidly coupled between the hollow annular inlet plenum and the separation chamber, and wherein the tangential inlet apertures are aligned in the direction of the inlet flow.

In yet another aspect, a particulate separation system for removing particles from a gaseous stream, the particulate filtration system having an inlet, an outlet, and a plurality of particle separators located between and in fluid communication with, the inlet and the outlet, wherein each of the plurality of particle separators receives less than about 5 percent by volume of the flow of the gaseous stream entering the inlet.

In a further aspect, an internal combustion engine having a particulate separation system for removing particles from a gaseous exhaust stream, the internal combustion engine having an exhaust outlet for exhaust gases produced by the internal combustion engine, and the particulate separation system including an inlet in communication with the exhaust outlet of the internal combustion engine, an outlet, and a plurality of particle separators located between and in fluid communication with, the inlet and the outlet, wherein each of the plurality of particle separators receives about 5 percent by volume, or less, of the flow of the gaseous stream entering the inlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
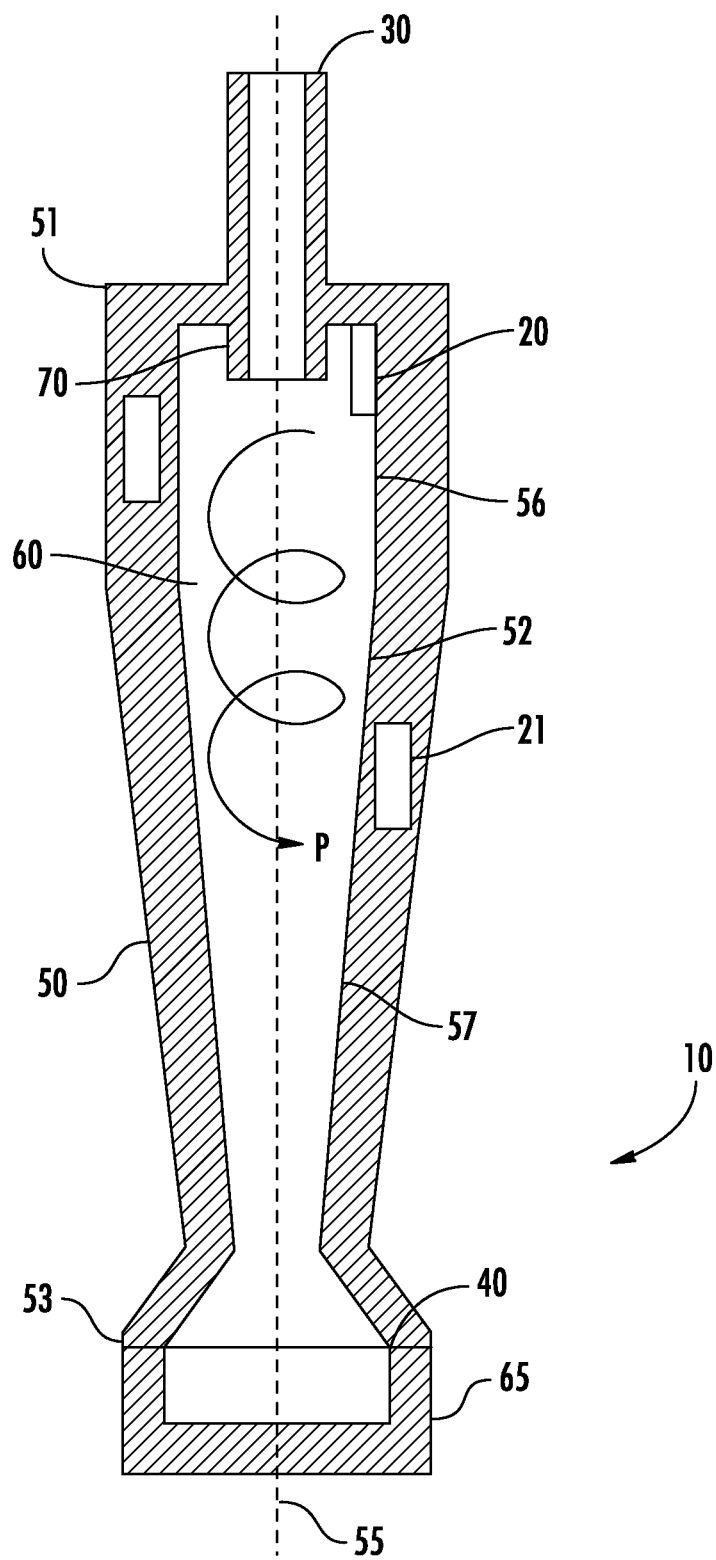
FIG. 1 is a cross-sectional view of an exemplary individual particle separator suitable for use in a particle separator system.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

The described embodiments of the present invention are directed to systems and methods for reducing particulate emissions. Such systems and methods may have general applicability, including mobile and non-mobile industrial, commercial, military, and residential applications such as aircraft, ships, railroad locomotives, off-road vehicles, and stationary powerplants, as well as manufacturing machinery and equipment.

As used herein, the term "forward" or "upstream" refers to moving in a direction toward the system inlet, or a component being relatively closer to the system inlet as compared to another component. The term "aft" or "downstream" used in conjunction with "forward" or "upstream" refers to a direction toward the rear or outlet of the system or being relatively closer to the system outlet as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Internal combustion engines, such as reciprocating diesel engines, produce combustion byproducts which are typically exhausted to ambient and combine with other gases in the atmosphere. Some byproducts are benign in nature, such as water vapor, while others such as particulate emissions (soot, for example) may have negative implications in large quantities in the atmosphere.

In today's world, with the increasing prevalence of diesel engines as the internal combustion engine of choice and increasing focus on fuel economy, this in turn gives rise to different emission regimes and different options and opportunities to reduce or eliminate undesirable particulate emissions.

FIG. 1 is a cross-sectional view of an exemplary individual particle separator 10 suitable for use in a particle separation system 200 described hereafter. As shown in FIG. 1, each particle separator 10 includes one or more inlets 20 for a particle laden flow, an outlet 30 for a reduced particle outflow, a particle outlet 40, and an internal separation chamber 60 bounded by a separator body 50. Separator body has a first end 51, a second end 53, and a peripheral wall 52 extending therebetween. Peripheral wall 52 has an axisymmetric shape and defines a separation chamber 60 having a centerline axis 55. A particle collection chamber 65 is provided to collect separated particles for eventual disposal and to provide closure to the second end 53 of the particle separator 10. Axisymmetric shapes for the peripheral wall 52 include cylindrical, frusto-conical, and other shapes of revolution. In the configuration shown in FIG. 1, the particle separator 10 is a cyclonic separator but other types of separators could be utilized in the particle separation system 200 described herein.

Also illustrated in FIG. 1 is the axisymmetric shape of the peripheral wall 52 of the separator body 50, the interior surface of which defines the separation chamber 60. In the embodiment shown, the peripheral wall has a cylindrical portion 56 and a conical or frusto-conical portion 57. This provides a tapered, converging shape to the separation chamber 60 which accelerates the circulation flow of the incoming, particle-laden stream to enhance the separation of particles.

In operation, particle-laden airflow enters the particle separator 10 from a manifold or other source through inlet 20, which, in the configuration shown in FIG. 1, takes the form of an inlet plenum 21 configured as a helical duct which wraps around the outside of the separator body 50 and imparts an initial degree of tangential velocity to the incoming particle-laden airflow prior to entering the interior of the separator body 50. Other types of inlets may be utilized depending upon the flow rates and volumes expected, as well as plumbing aspects of connecting the particle separator 10 to the incoming source of particle-laden airflow and manufacturing considerations. The incoming flow then enters the separation chamber 60 near, or adjacent to, the first end 51 of the separator body 50. The flow of particle-laden air P enters from the inlet 20 into the page across the back of the separation chamber then begins to circle the inside of the separation chamber 60 in a counterclockwise direction and then gradually move toward the second end 53 of the separator body, spurred onward by the continuous flow of incoming air. This circular flow pattern tends to force suspended particles radially outward toward the wall of the separation chamber 60.

In the configuration shown in FIG. 1, the separation chamber 60 includes a cylindrical portion 56 near the first end 51 of the separator body 50 and a tapered, conical portion 57 near the second end 53 of the separator body 50. The tapering of the separation chamber 60 through use of a conical portion 57 aids in accelerating the flow and directing suspended particles radially outward toward the wall of the separation chamber 60. Since the outlet 30 is near the first end 51, the airflow circulating within the separation chamber 60 eventually reaches the second end 53 and turns toward the first end 51. Suspended particles which are cast radially outward toward the peripheral wall of the separation chamber 60 are unable to make the turn toward the outlet 30 and thus fall out of suspension and are deposited into the particle collection chamber 65, which encloses the second end 53 of the separator body 50. A vortex tube 70 extends axially inwardly from the outlet 30 and aids in maintaining a separation between incoming flow from the inlet 20 and outgoing flow through the outlet 30.

In the configuration shown in FIG. 1, the outlet 30 may be oriented vertically upwardly, that is to say, in a direction opposite the force of gravity, to take advantage of the force of gravity in directing separated particles into the particle collection chamber 65. However, depending upon plumbing and other installation considerations, it may be desirable in some circumstances to orient the separator 10 at an angle other than vertical and with the outlet 30 in a position other than vertically upwardly.

It is believed to be important that the separation chamber 60 be a closed volume, i.e., to be closed at the second end 53 of the separator body such as by the particle collection chamber 65. Where multiple separators are utilized together, it may be possible for them to share a common particle collection chamber although it is believed that having individual particle collection chambers for each particle separator 10 improves efficiency by eliminating "cross talk", or pressure and flow interference, between adjacent particle separators. It is also believed to be important that the outlet 30 should be on the same centerline as the collection chamber 65.

Figure 2:
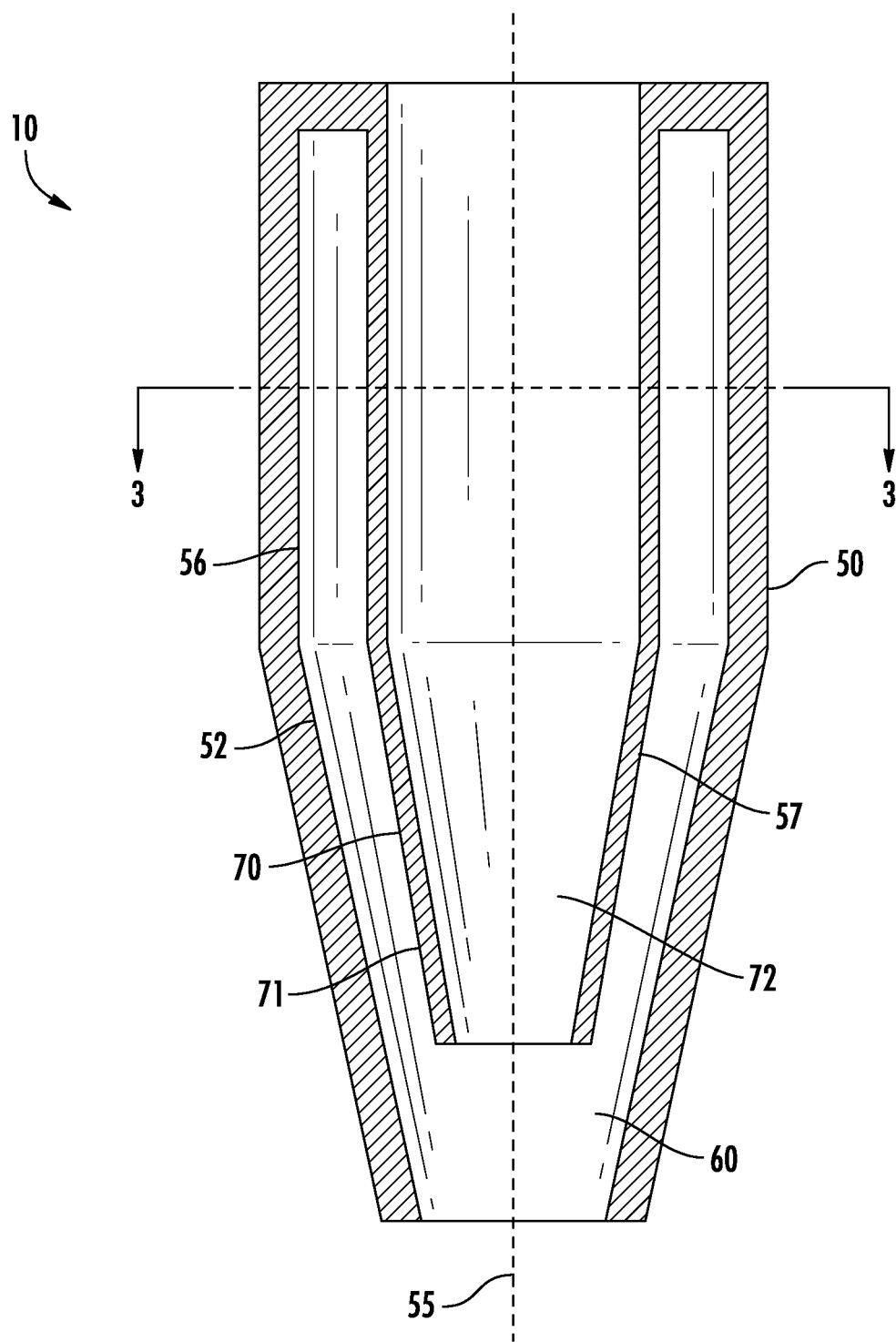
FIG. 2 is an enlarged cross-sectional illustration of one exemplary embodiment of a particle separator.

FIG. 2 is an enlarged cross-sectional illustration of one exemplary embodiment of a separator 10. In this embodiment, the separation chamber 60 includes an elongated vortex tube 70 which extends axially inwardly from the first end 51 of the separator body 50. The interior 72 of the vortex tube 70 communicates with the separator fluid outlet 30, through which fluid having a reduced particle concentration exits the separator 10. The vortex tube 70 includes a peripheral wall 71 which isolates the interior 72 of the vortex tube 70 from the separation chamber 60. The peripheral wall 71, in the embodiment of FIG. 2, has a cross-sectional shape which correlates to the shape of the inner surface of the peripheral wall 52 of the separator body 50, thus maintaining a relatively constant spacing between the outer surface of the peripheral wall 71 of the vortex tube 70 and the inner surface of the peripheral wall 52 of the separator body 50. The shape of vortex tube 70 thus correlates to the shape of the separation chamber 60. The vortex tube 70 terminates at a free end 74 and, in the configuration shown in FIG. 2, is substantially longer than the vortex tube 70 of the embodiment of FIG. 1.

Figure 3:
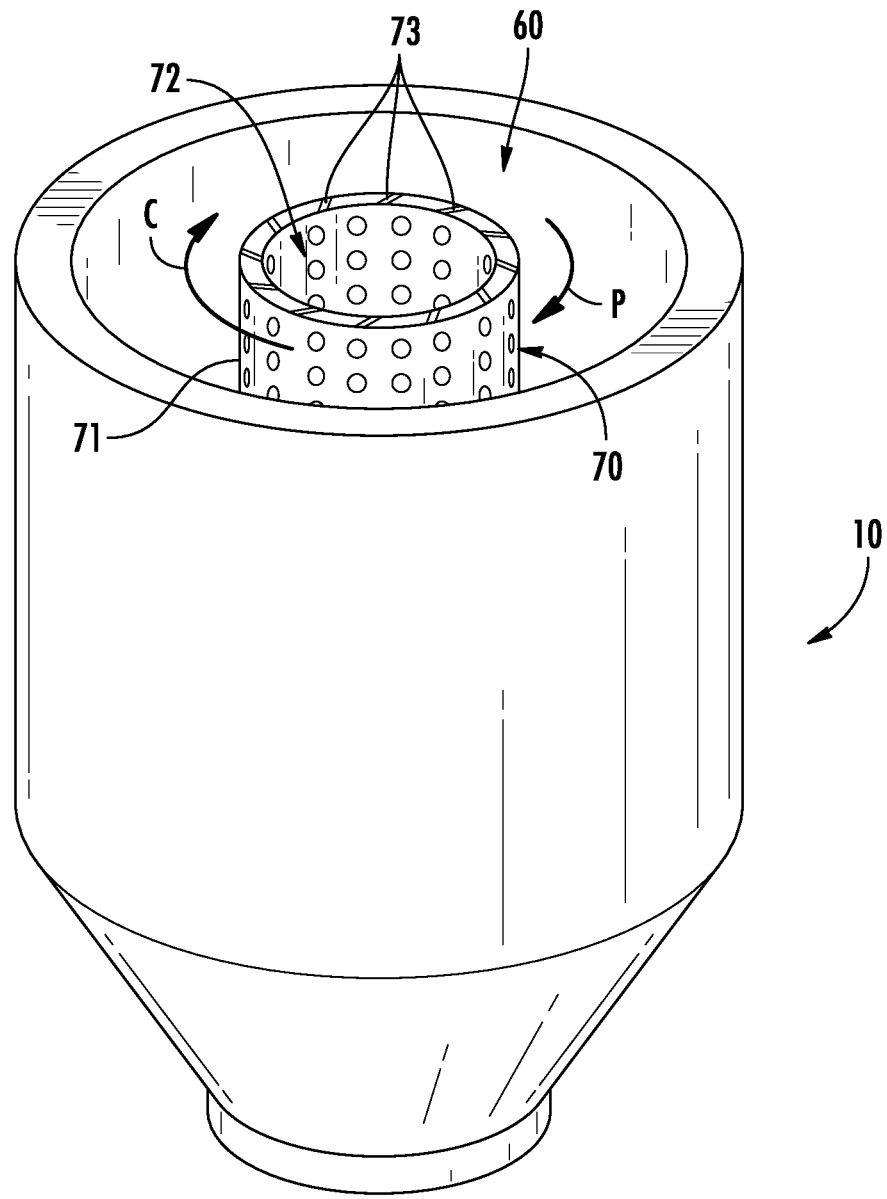
FIG. 3 is an enlarged cross-sectional illustration taken along line 3-3 of FIG. 2.

FIG. 3 is an enlarged cross-sectional illustration taken along line 3-3 of FIG. 2, illustrating another aspect of the particle separator 10. As shown in FIG. 3, a plurality of outlet apertures 73 penetrate the peripheral wall 71 of the vortex tube 70, such that the apertures 73 are angled radially outwardly in the direction opposite of the dominant annular inlet flow direction from the inlet 20 into the separation chamber 60. These apertures 73 thus enhance the separation of particles from the fluid. A small fraction of the clean airflow C may exit the vortex tube 70 through these apertures and urge the particle laden flow P toward the wall of the separation chamber 60. However, the sharp angle between the angle of the apertures 73 and the flow direction prevents entrained particles P from making the turn toward the outlet 30 and exiting the separation chamber 60 prematurely before separation.

Figure 4:
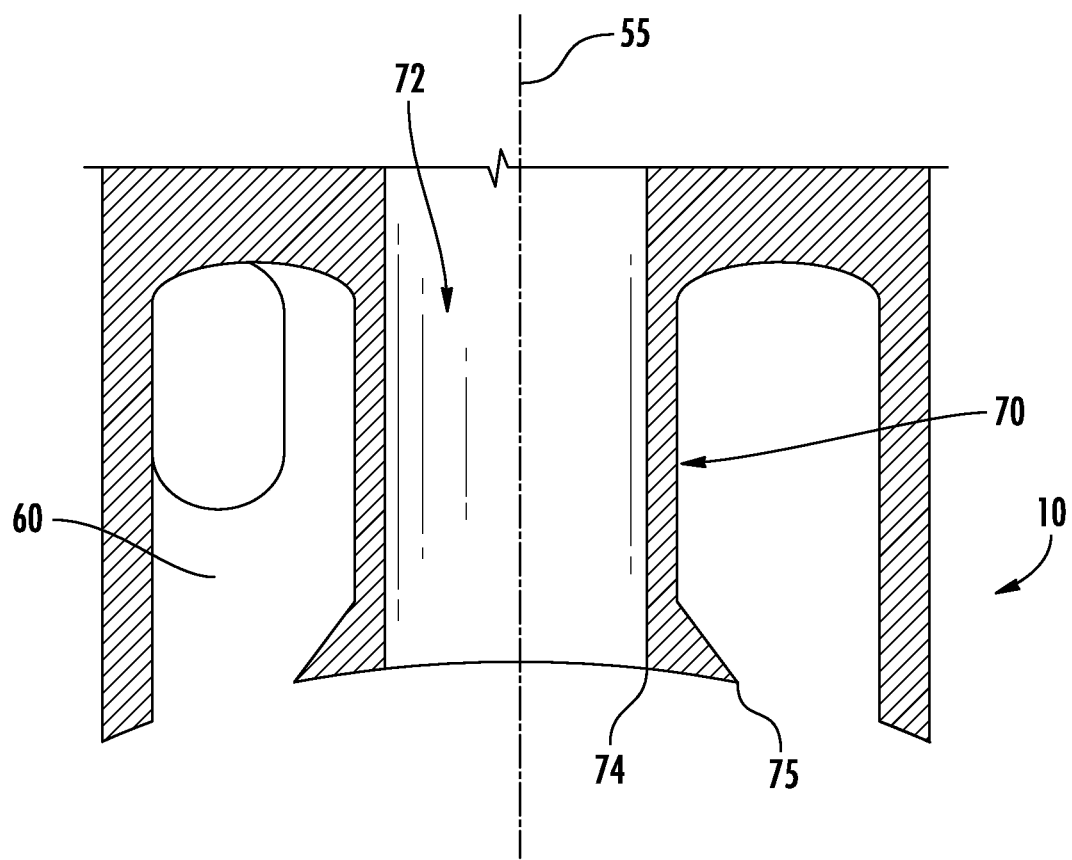
FIG. 4 is an enlarged partial cross-sectional illustration similar to FIG. 2 of another exemplary embodiment of a particle separator.

FIG. 4 illustrates another embodiment of a particle separator 10, in which the vortex tube 70 is comparatively short in relation to the overall length of the separator body 50 and the separation chamber 60, similar to the illustration of FIG. 1. In this embodiment, the vortex tube 70 retains a cylindrical shape substantially absent taper and terminates in a free end 74. However, other shapes and configurations of vortex tubes may be employed such as more elongated proportions and/or tapered tube configurations. To aid in the separation of particles, the free end includes an annular lip 75 which extends radially outwardly from the free end 74 such that particles that are ejected from the swirling vortex flow radially outwardly toward the inner surface of the peripheral wall 52 which defines the outer extent of the separation chamber 60. In such a configuration, with a relatively short vortex tube 70, this annular lip 75 prevents entrained particles from short-circuiting the separation process and exiting the separation chamber 60 through the vortex tube 70 toward the outlet 30.

Figure 5:
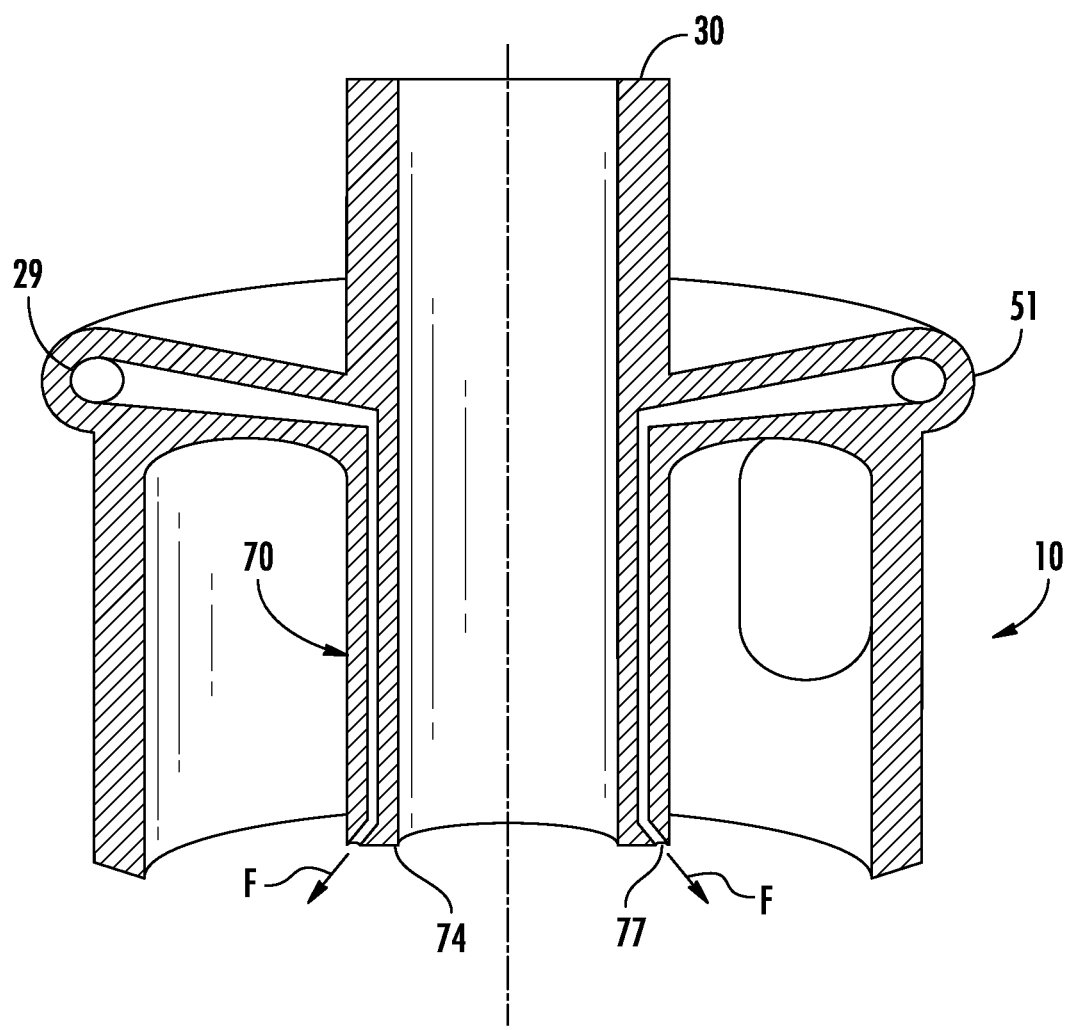
FIG. 5 is an enlarged partial cross-sectional illustration similar to FIG. 2 of another exemplary embodiment of a particle separator.

FIG. 5 illustrates another embodiment of a particle separator 10, in which the vortex tube 70 is comparatively short in relation to the overall length of the separator body 50 and the separation chamber 60. In this embodiment, the vortex tube 70 retains a cylindrical shape substantially absent taper and terminates in a free end 74. However, other shapes and configurations of vortex tubes may be employed such as more elongated proportions and/or tapered tube configurations. To aid in the separation of particles, the free end in the exemplary embodiment shown includes a plurality of vortex tube free end apertures 77 which extend axially outwardly from the free end 74 such that pressurized fluid F from a fluid source 29 is emitted axially away from the free end 74 and particles from the swirling flow are directed radially outwardly toward the inner surface of the peripheral wall 52 which defines the outer extent of the separation chamber 60 as well as axially toward the second end 53 of the separator 10. Apertures 77 may be distributed uniformly or non-uniformly around the free end 74 of the vortex tube 70, and may be uniformly or non-uniformly sized. Other aperture configurations may be employed, such as elongated or shaped apertures or a single annular aperture. The airflow from these apertures 77 forms a "virtual extension" of the vortex tube 70, similar to a fence, and prevents entrained particles from short-circuiting the separation process and exiting the separation chamber 60 through the vortex tube 70 toward the outlet 30. The fluid source 29 for these apertures 77 may be fed from the incoming airflow through the inlet plenum or may be fed from another separate source, such as pre-filtered clean air.

Figure 6:
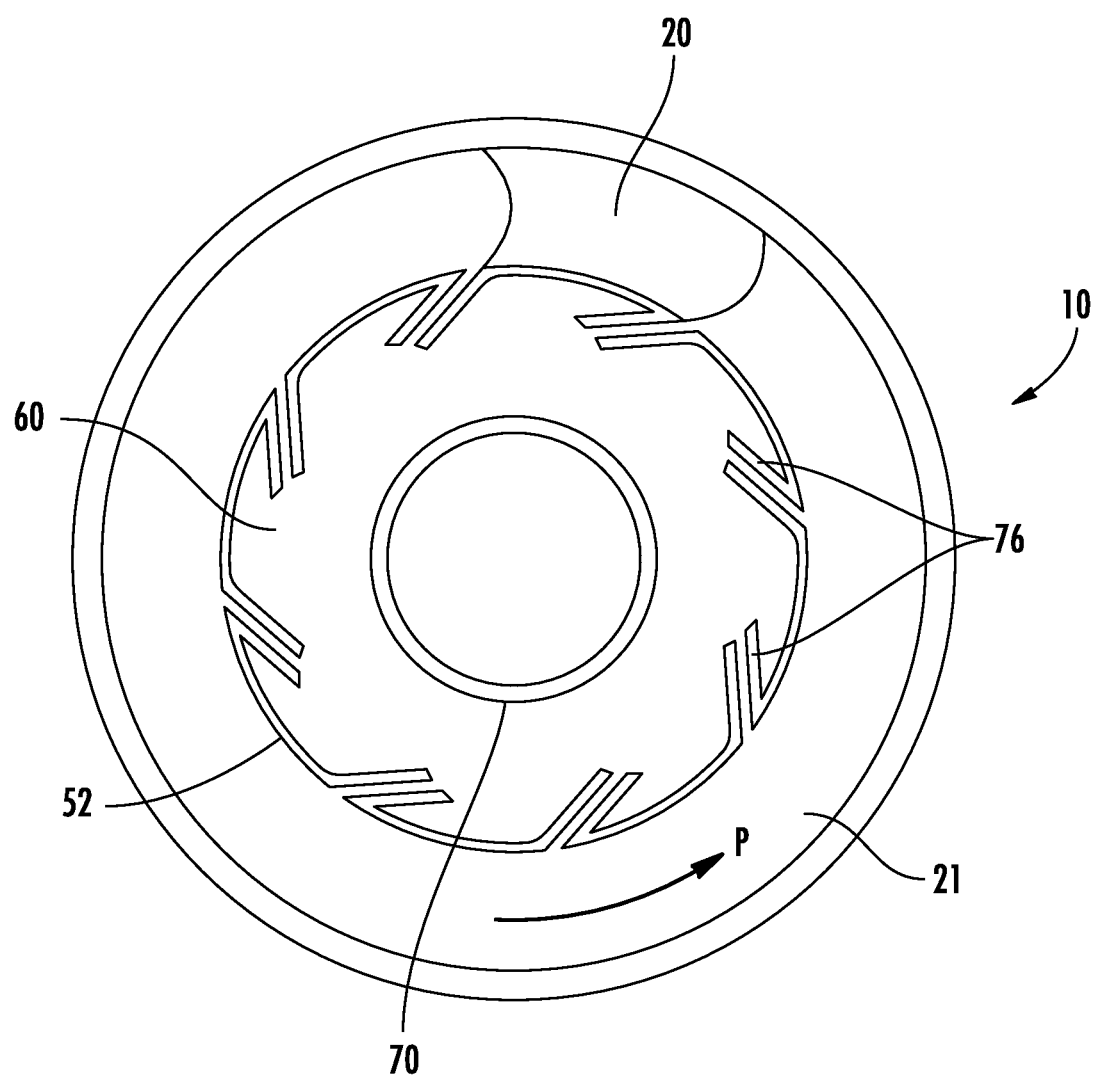
FIG. 6 is an enlarged cross-sectional illustration similar to FIG. 3 of another exemplary embodiment of a particle separator.

FIG. 6 is a cross-sectional illustration depicting another embodiment of a particle separator 10, in which the particle-laden fluid flow enters the separation chamber 60 through a plurality of tangentially-oriented apertures 76 which communicate between an inlet plenum 21 and the separation chamber 60. The inlet plenum 21 may be shaped and oriented to "pre-swirl", or impart an annular swirl velocity component to, the incoming fluid flow which will enter the separation chamber 60. Apertures 76 may be distributed uniformly or non-uniformly around the first end 51 of the separator body 50, and may be uniformly or non-uniformly sized. These tangentially-oriented apertures aid in maintaining and increasing the angular velocity component of the incoming fluid velocity. While the term "tangentially-oriented" has been used, the apertures 76 may not be purely tangential in the classical sense but are angled in a direction so as to impart angular motion to the flow. Compound angles may be utilized as well.

Figure 7:
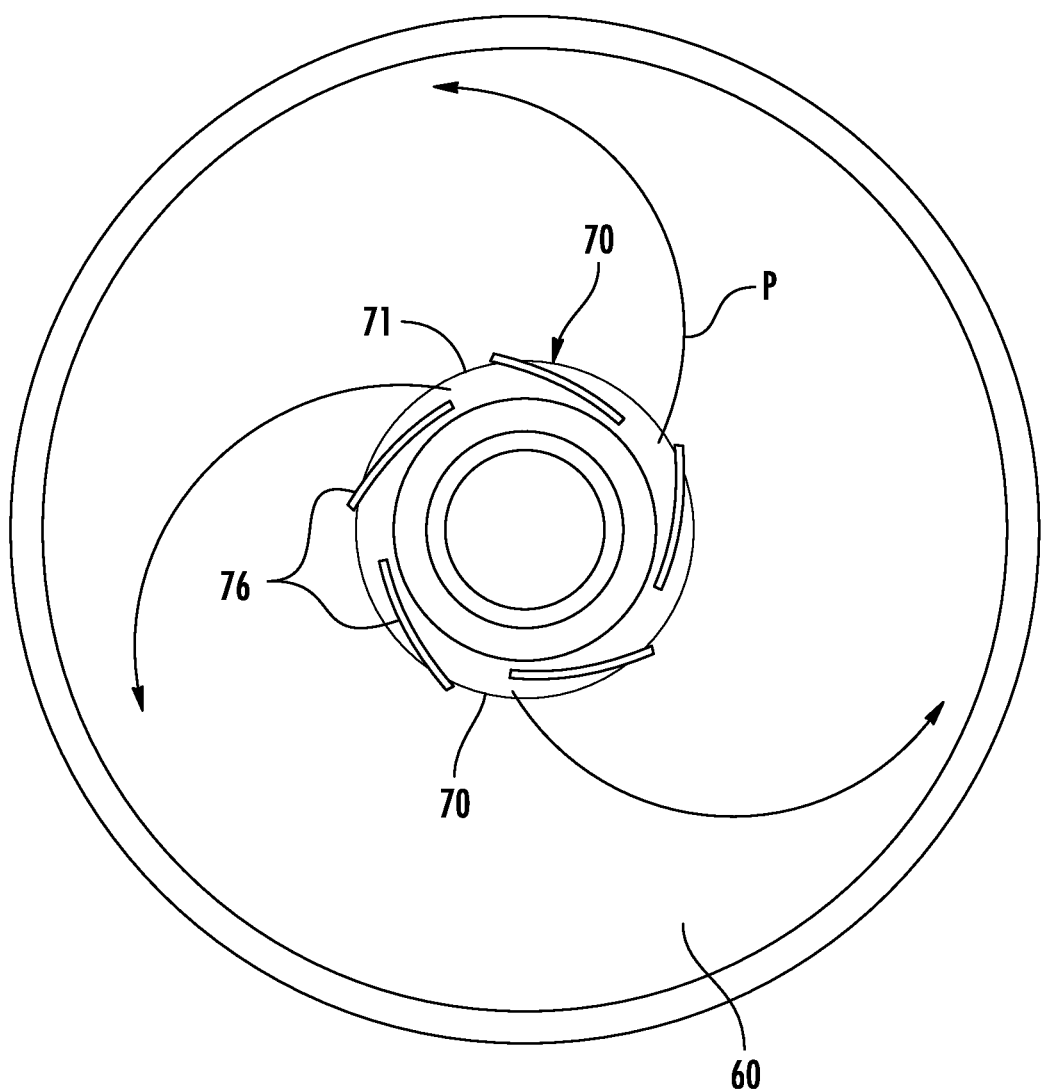
FIG. 7 is an enlarged cross-sectional illustration similar to FIG. 3 of another exemplary embodiment of a particle separator.
Figure 8:
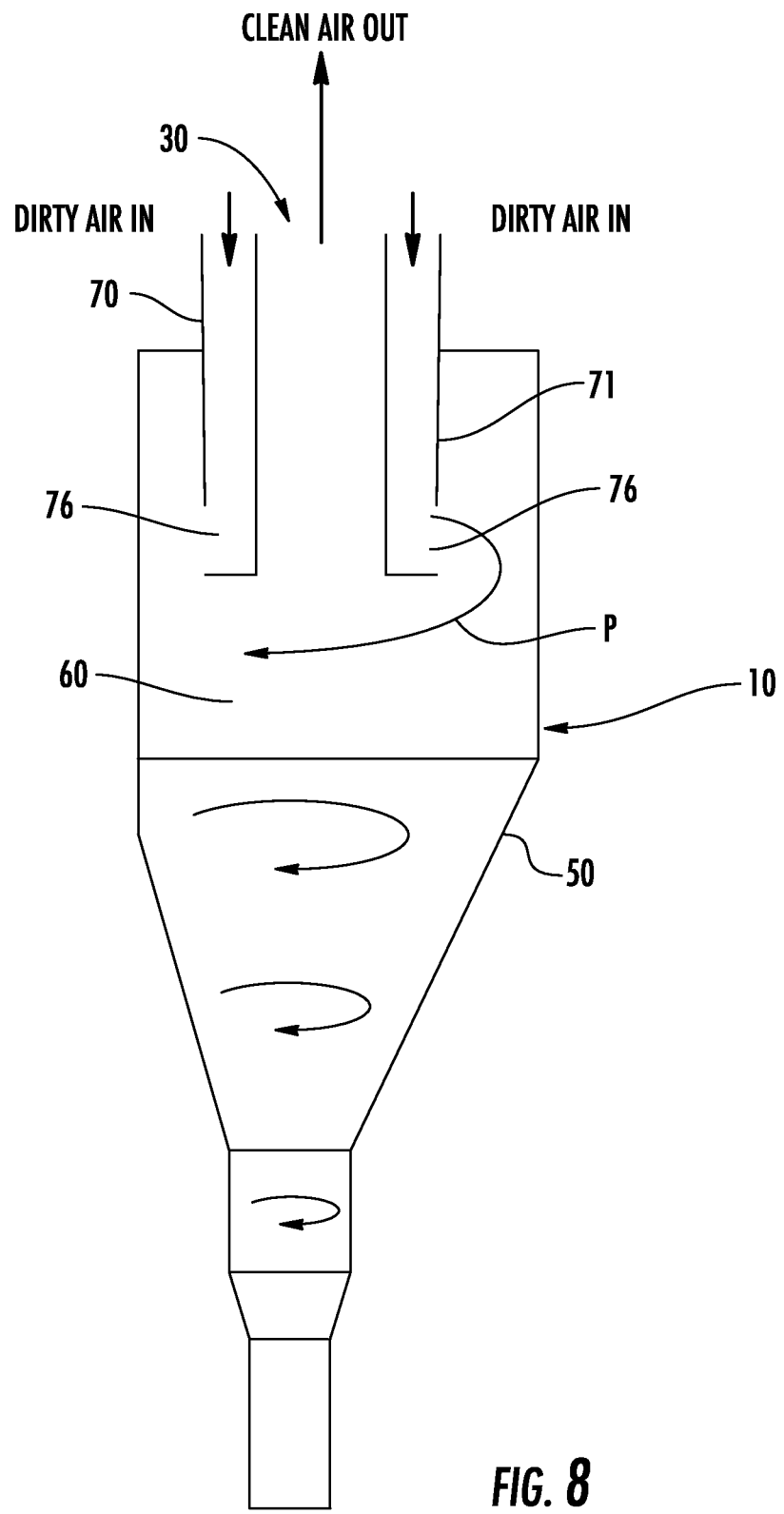
FIG. 8 is an enlarged cross-sectional illustration similar to FIG. 2 of the exemplary particle separator of FIG. 7.

FIGS. 7 and 8 are cross-sectional illustrations depicting another embodiment of a particle separator 10, in which the particle-laden fluid flow enters the separation chamber 60 through a plurality of tangentially-oriented apertures 76 which communicate with the separation chamber 60. The apertures 76 are shaped and oriented to "pre-swirl", or impart an annular swirl velocity component to, the incoming fluid flow which will enter the separation chamber 60. Apertures 76 may be distributed uniformly or non-uniformly around the peripheral wall 71 of the vortex tube 70, and may be uniformly or non-uniformly sized. These tangentially-oriented apertures aid in maintaining and increasing the angular velocity component of the incoming fluid velocity and directing the particle-laden flow P radially outwardly toward the peripheral wall of the separation chamber 60. This serves to align all of the forces in the same direction to aid in effective particle separation. While the term "tangentially-oriented" has been used, the apertures 76 may not be purely tangential in the classical sense but are angled in a direction so as to impart angular motion to the flow. Compound angles may be utilized as well.

With any of the foregoing exemplary embodiments, components such as the vortex tube 70 may or may not be unitarily formed with the separator body and other components. Any or all of the components may be additively manufactured either as a unitary assembly or individual components assembled after manufacture.

Figure 9:
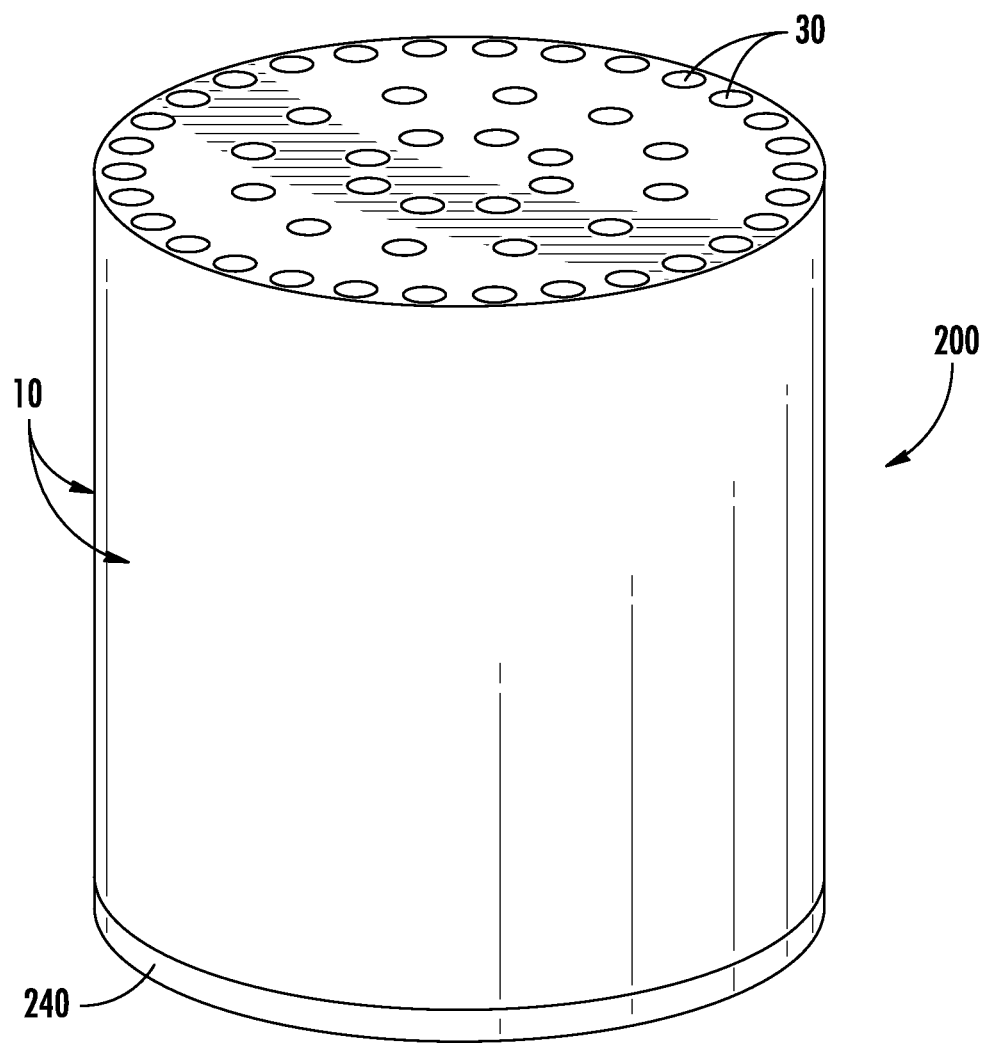
FIG. 9 is a perspective view from above of an exemplary embodiment of a particle separation system as described herein.
Figure 10:
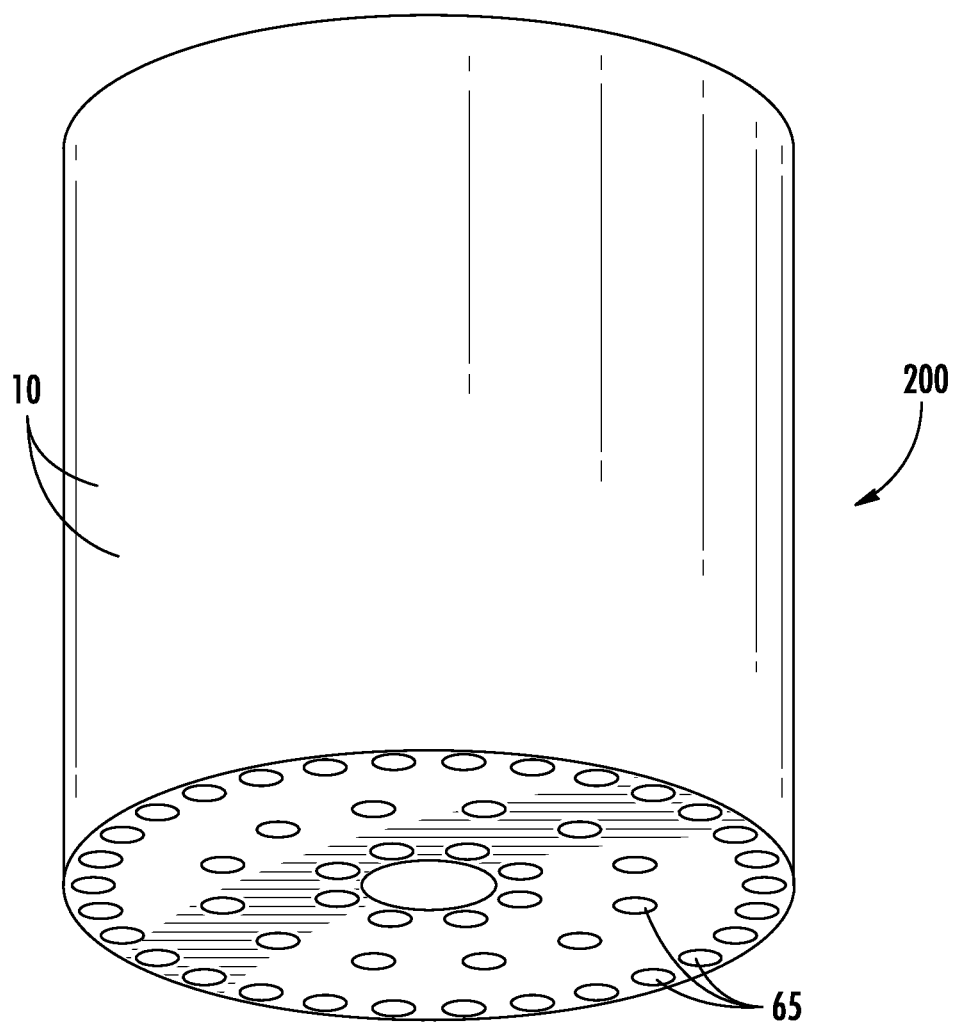
FIG. 10 is a perspective view from below of the exemplary particle separation system of FIG. 9.

FIG. 9 is a perspective view of an exemplary embodiment of a particle separation system 200. The particle separation system 200 includes a plurality of individual particle separators 10 and, in the configuration shown, includes a network of conduits forming a manifold to direct incoming particle-laden air to the inlet plenums 21 and inlets 20 of individual particle separators 10. The individual separators 10 may be fed in parallel from the incoming manifold, or may be partially or fully staged for sequential separation operations. The individual separators 10 may also be of varying sizes and/or configurations and may be designed to target separation of the same or varying particle sizes. At one end of the particle separation system 200 is a particle collection chamber closure 240, which may be removably secured to the system to seal the particle collection chamber 65 of one or more particle separators 10. FIG. 10 is a similar view to FIG. 9, but from below to illustrate the plurality of individual particle separation chambers 65, each of which may serve a single particle separator 10. A common closure 240 may then close all of the chambers 65, as shown in FIG. 9, yet provide for easy removal as shown in FIG. 10 to empty captured particles as needed. Alternatively, a single particle separation chamber 65 may be designed to serve all of the individual separators 10.

Figure 11:
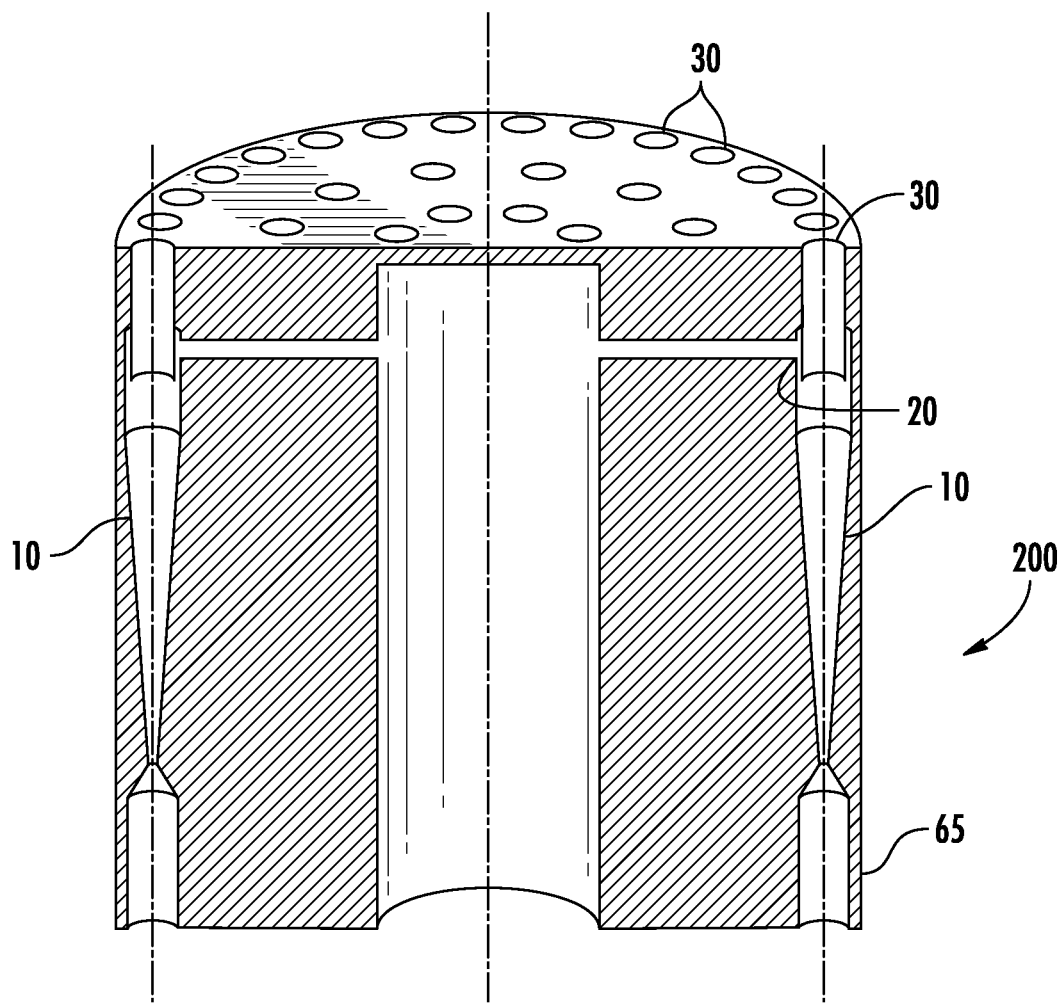
FIG. 11 is a cross-sectional view of the exemplary particle separation system of FIG. 9.

FIG. 11 is a cross-sectional illustration of the system 200 of FIG. 9, illustrating with greater clarity the arrangement of the individual separators 10 and their separator inlets 20.

Figure 12:
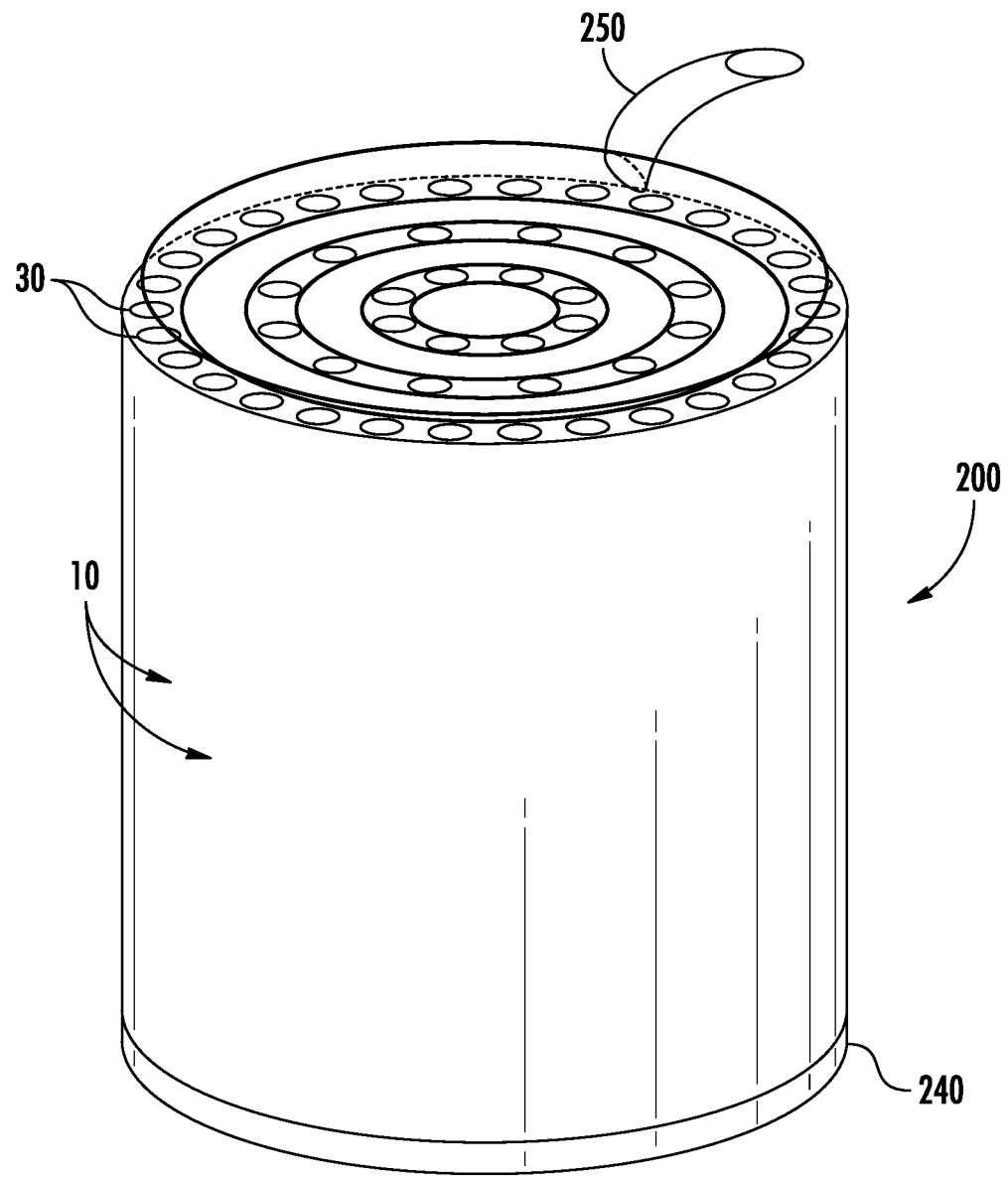
FIG. 12 is a perspective view from above of an exemplary embodiment of a particle separation system having a single controlled inlet.

FIG. 12 is a perspective view from above of an exemplary embodiment of a particle separation system 200 having a single controlled inlet 250. In this configuration, all of the incoming particle-laden flow enters the system 200 through a common inlet which may be controlled by one or more valves to modulate the flow into the system based on the volume or quality of the incoming flow, or other conditions which may require the duty cycle of the system to be varied. A control system may regulate the inlet 250 based on sensor inputs or other parameters, or operator control, and the control of the system 200 may be interconnected with a larger control system which controls a vehicle or a vehicle's propulsion system.

Figure 13:
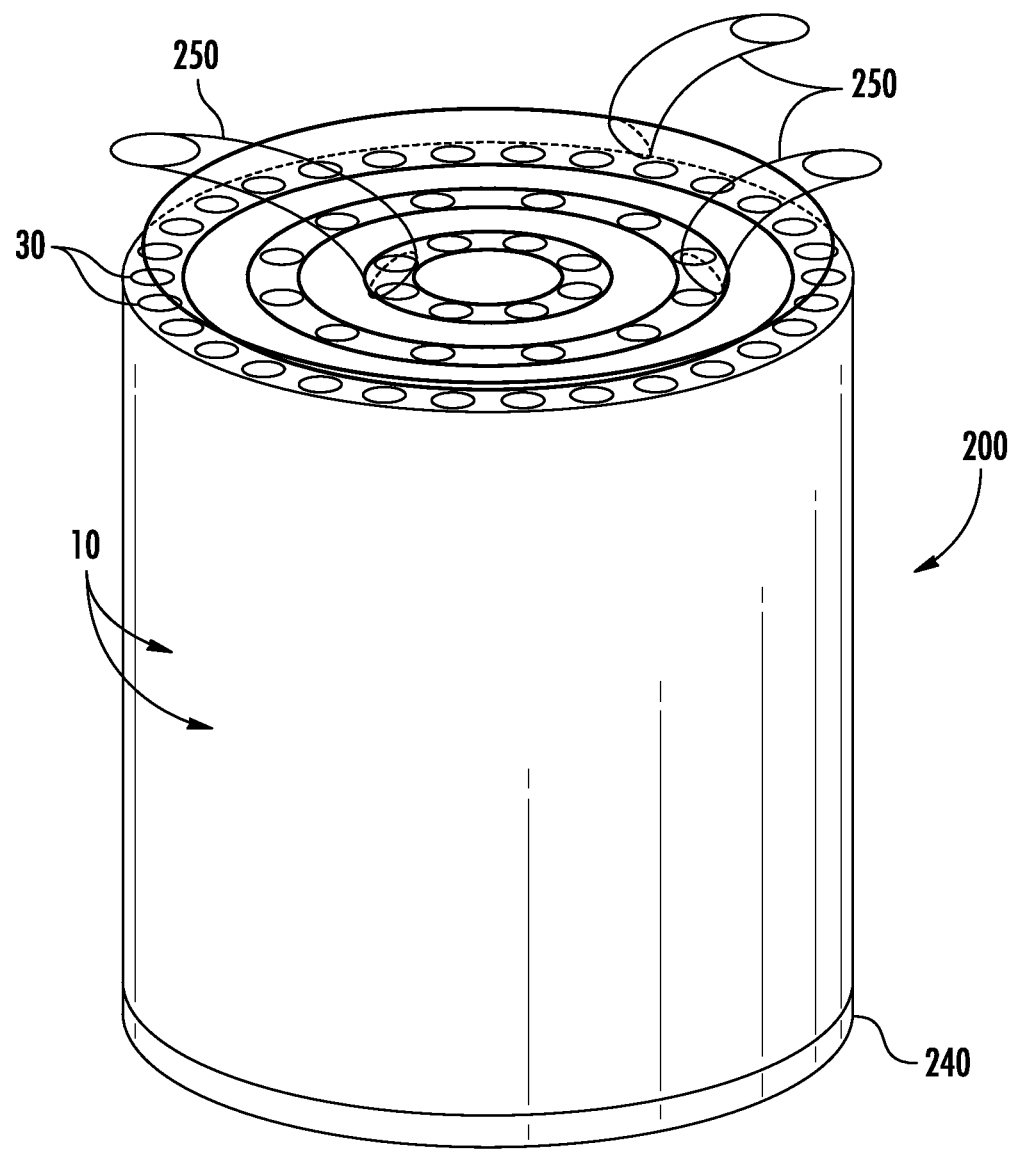
FIG. 13 is a perspective view from above of an exemplary embodiment of a particle separation system having multiple controlled inlets.

FIG. 13 is a perspective view from above of an exemplary embodiment of a particle separation system 200 having multiple controlled inlets 250. In this configuration, the incoming particle-laden flow enters the system 200 through a plurality of inlets which may be controlled by one or more valves to modulate the flow into the system based on the volume or quality of the incoming flow, or other conditions which may require the duty cycle of the system to be varied. A control system may regulate the inlets 250 based on sensor inputs or other parameters, or operator control. In the configuration shown in FIG. 13, particle separators 10 are arranged in concentric rings and each ring may be fed from a shared inlet 250. The controlled inlets 250 may be utilized to control all of the individual separators in parallel, or may be staged such that each controlled inlet 250 may control a set of individual particle separators, such that depending on operating conditions a small set of separators may be utilized for low flow conditions, with additional sets of separators brought online to respond to increased demand. Separators 10 may thus be aggregated in any suitable number for operation.

Figure 14:
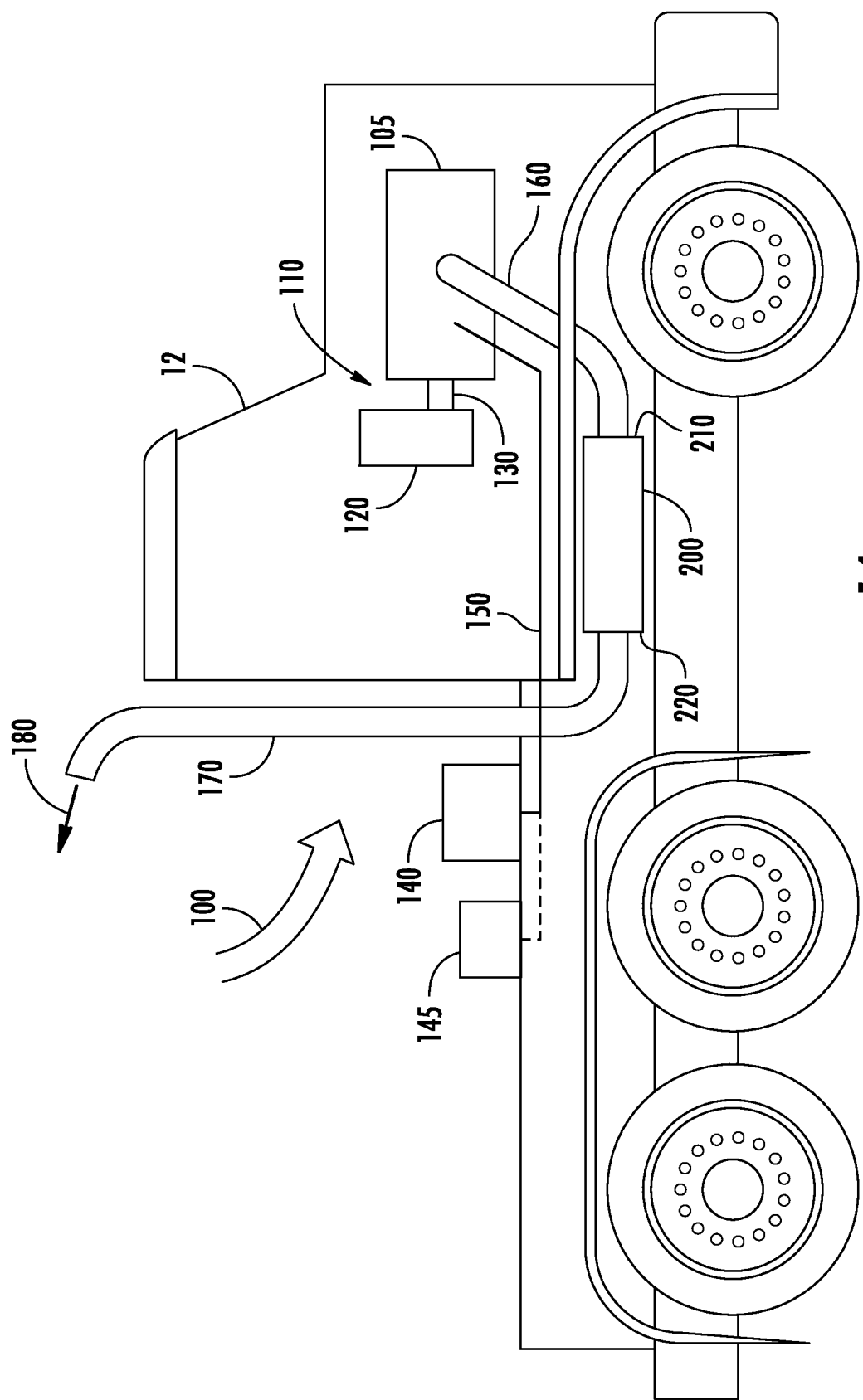
FIG. 14 is an illustration of an exemplary installation of the system of FIG. 9 in a land vehicle.

FIG. 14 is an illustration of one example of an exemplary application for a particulate emission reduction system in the form of particle separation system 200 described herein. In FIG. 14, a vehicle such as a land vehicle 100 in the form of an over-the-road truck 12 is illustrated. Vehicle 100 includes an internal combustion engine 105, such as a reciprocating diesel engine, which draws atmospheric intake air 110 through an inlet filter 120 and through an intake manifold 130 to feed air into the internal combustion engine 105. After combustion takes place within the internal combustion chambers, exhaust gases exit the internal combustion engine 105 through an exhaust manifold and pass through an exhaust pipe 160 which connects to the inlet 210 of the particle separation system 200. The outlet 220 of the particle separation system 200 then connects to an exhaust stack 170, which may include a muffler, which then emits the exhaust gases 180 to the atmosphere at ambient conditions. Fuel for the internal combustion engine 105 may be stored in a fuel tank 140 and be fed through a fuel line 150 to the internal combustion engine 105. Also shown is an optional tank 145 for Diesel Emission Fluid (DEF), urea, or other suitable exhaust additives which may be utilized.

Other features, such as particle separators or filters, may also be incorporated into the emission reduction system as a combined unit, or may be incorporated into the downstream exhaust piping network leading from the internal combustion engine to the atmosphere. Other emission reduction devices, such as exhaust gas recirculation (EGR) systems, oxygen reduction or removal systems, selective non-catalytic reduction (SNCR) and selective catalytic reduction (SCR) systems, afterburner systems, may be utilized upstream and/or downstream of the particle separation systems described herein.

Figure 15:
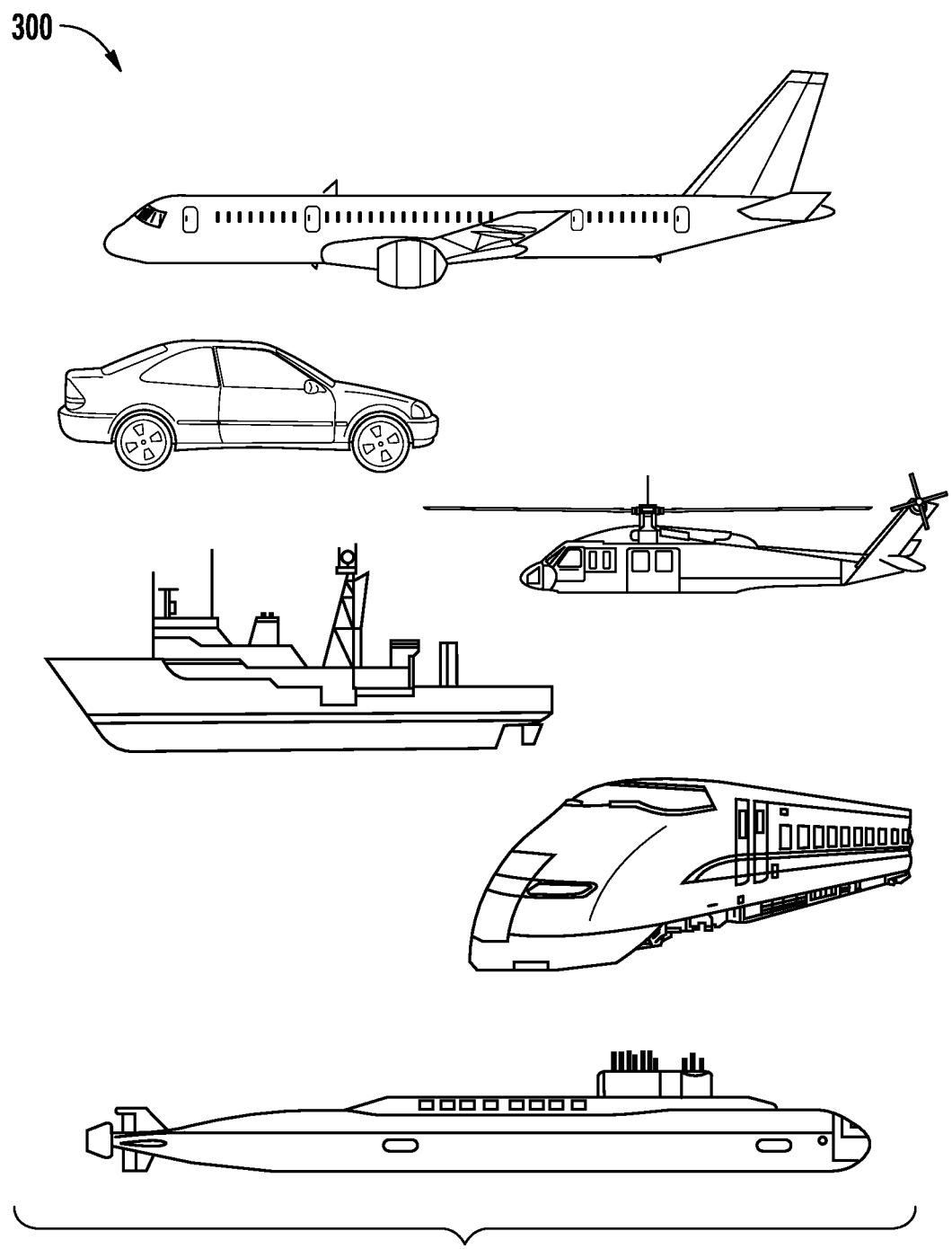
FIG. 15 is an illustration of exemplary vehicles which may employ an exemplary system such as the system of FIG. 9.

FIG. 15 is an illustration of exemplary land, air, and sea vehicles 300 which may employ an exemplary particle separation system such as the system of FIG. 9.

Particle separation system 200 may be designed and constructed as a modification package, or aftermarket kit, which is retrofittable to an internal combustion engine in addition to or instead of any exhaust system components already in place. Alternatively, particle separation system 200 may be designed and constructed as an integral part of the internal combustion engine and its associated exhaust system components.

Components of the particle separation system described herein may be manufactured by any suitable manufacturing techniques using any suitable materials for the environment, operating conditions, and installation location required. Some components, such as the plenums and cyclonic separators, for example, may be advantageously manufactured using additive manufacturing techniques either individually or collectively as a single assembly. Suitable manufacturing techniques and materials will be apparent to those of ordinary skill in the art. Suitable materials may include polymeric materials, ceramic materials, metallic materials, or any other materials suitable for the operating environment the separation system and the individual separators may encounter in service. System components may be made of materials capable of sustaining their integrity, structure, and performance in high temperature environments as may be experienced with exhaust gases.

It should be appreciated that application of the particle separation system described herein is not limited to land-based vehicles with reciprocating engines, but may have general applicability, including other mobile and non-mobile industrial, commercial, and residential applications such as aircraft, ships, railroad locomotives, off-road vehicles, and stationary powerplants. Other internal combustion engine types besides reciprocating engines may also be included within scope, such as gas turbine engines. It should also be further appreciated that while embodiments described herein have a given orientation the embodiments can be positioned in other directions and/or orientations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A particle separator for removing particles from a gaseous stream, the particle separator comprising:
   a separator body having a centerline axis and a body peripheral wall defining a separation chamber;
   a fluid inlet in fluid communication with the separation chamber;
   a particle outlet in fluid communication with the separation chamber;
   a fluid outlet in fluid communication with the separation chamber; and
   a vortex tube having a hollow interior and a tube peripheral wall extending along the centerline axis from one end of the separator body at the fluid outlet to a free end within the separation chamber, the tube peripheral wall comprising a plurality of apertures for a fluid flow through the plurality of apertures causing a cyclonic fluid flow, and the tube peripheral wall fluidly coupling the fluid outlet and the separation chamber.

2. The particle separator of claim 1, wherein the plurality of apertures comprises a plurality of angled outlet apertures fluidly coupled between the hollow interior and the separation chamber.

3. The particle separator of claim 2, wherein the angled outlet apertures are aligned in a direction opposing a flow of the gaseous stream through the fluid inlet.

4. The particle separator of claim 1, wherein the vortex tube comprises a cross-sectional shape which correlates to a shape of the separation chamber.

5. The particle separator of claim 1, wherein the vortex tube tapers from a first diameter at the one end of the separator body to a second diameter at the free end of the vortex tube, the second diameter being smaller than the first diameter.

6. The particle separator of claim 1, wherein the vortex tube is unitarily formed with the separator body.

7. The particle separator of claim 1, wherein the free end of the vortex tube comprises a radially outwardly projecting lip.

8. The particle separator of claim 7, wherein the plurality of apertures comprises a plurality of tangential inlet apertures fluidly coupled between the hollow interior and the separation chamber.

9. The particle separator of claim 7, wherein the vortex tube is unitarily formed with the separator body.

10. The particle separator of claim 1, wherein the free end of the vortex tube comprises the plurality of apertures for directing a portion of the gaseous stream axially and radially outwardly from the free end.

11. The particle separator of claim 10, wherein the plurality of apertures comprises a plurality of tangential inlet apertures fluidly coupled between the hollow interior and the separation chamber.

12. The particle separator of claim 10, wherein the vortex tube is unitarily formed with the separator body.

13. A particle separator for removing particles from a gaseous stream, the particle separator comprising:
    a separator body having a centerline axis and a body peripheral wall defining a separation chamber;
    a fluid inlet in fluid communication with the separation chamber;
    a particle outlet in fluid communication with the separation chamber;
    a fluid outlet in fluid communication with the separation chamber;
    a vortex tube having a hollow interior and a tube peripheral wall extending along the centerline axis from one end of the separator body at the fluid outlet to a free end within the separation chamber; and
    a hollow annular inlet plenum fluidly coupling the fluid inlet and the separation chamber;
    wherein the tube peripheral wall of the vortex tube further comprises a plurality of tangential inlet apertures; and
    wherein the tangential inlet apertures are aligned in a direction of a flow of the gaseous stream through the fluid inlet.

14. The particle separator of claim 13, wherein the vortex tube is unitarily formed with the separator body.

15. The particle separator of claim 13, wherein the separation chamber has an axisymmetric shape.

16. The particle separator of claim 13, wherein at least a portion of the separation chamber has a conical shape.

17. The particle separator of claim 13, wherein the tangential inlet apertures are approximately equally circumferentially spaced around the tube peripheral wall.

18. The particle separator of claim 13, wherein the tangential inlet apertures are unitarily formed into the tube peripheral wall of the vortex tube.

19. A particle separator for removing particles from a gaseous stream, the particle separator comprising:
    a separator body having a centerline axis and a body peripheral wall defining a separation chamber;
    a fluid inlet in fluid communication with the separation chamber;
    a particle outlet in fluid communication with the separation chamber;
    a fluid outlet in fluid communication with the separation chamber;
    a plurality of angled inlet apertures fluidly coupled between the fluid inlet and the separation chamber; and
    a vortex tube having a hollow interior and a tube peripheral wall extending along the centerline axis from one end of the separator body at the fluid outlet to a free end within the separation chamber, the tube peripheral wall comprising a plurality of apertures for a fluid flow through the plurality of apertures causing a cyclonic fluid flow.

20. The particle separator of claim 19, wherein the separation chamber has an axisymmetric shape.

* * * * *